Jan. 20, 1925.
W. R. McGOWEN
AUTOMOBILE BUMPER
Filed Nov. 9, 1923
1,523,984
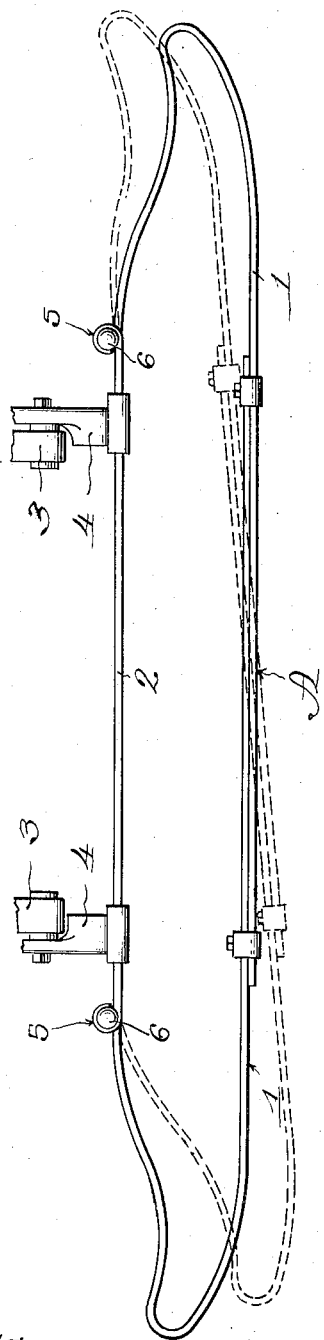
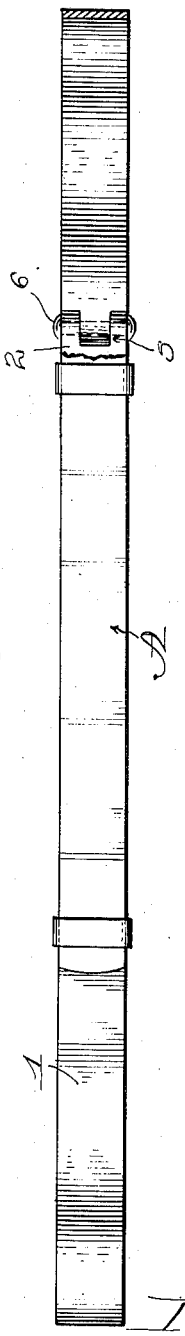
Witness:
Chas. P. Koursh
Inventor,
William R. McGowen,
By Offield, Bulkley, Poole & Scott, Attys.

Patented Jan. 20, 1925.

1,523,984

UNITED STATES PATENT OFFICE.

WILLIAM R. McGOWEN, OF CHICAGO, ILLINOIS.

AUTOMOBILE BUMPER.

Application filed November 9, 1923. Serial No. 673,636.

*To all whom it may concern:*

Be it known that I, WILLIAM R. MC-GOWEN, a citizen of the United States, and a resident of Chicago, in the county of Cook and State of Illinois, have invented certain new and useful Improvements in Automobile Bumpers, of which the following is a specification.

This invention relates to improvements in automobile bumpers and more particularly to bumpers of the resilient bar type wherein the impact is absorbed by the yielding action of the spring-like structure.

The object of the invention is to provide a construction for a bumper of the general character described, whereby provision is made for increasing the flexibility of the structure, without sacrificing its strength or capacity for resisting the impact, and particularly to permit greater freedom of movement at certain points in the structure, in order that the same may undergo the degree of distortion required to properly distribute the impact, and yet not exceed the limit of resiliency of the material and cause the same to suffer permanent distortion.

The object sought is obtained by employing hinged or pivotal connections at the points in the bumper structure where the maximum stress is received, as will be presently pointed out in connection with the accompanying drawings, in which—

Figure 1 is a top plan view of the bumper and

Figure 2 is a view in front elevation with a portion broken away to disclose the parts behind.

The bumper herein disclosed has the form of an elongated or flat loop adapted to extend across the front of a vehicle, and to be attached to the ends of the frame members by suitable brackets or fittings. The material used is preferably flat bars of spring steel, with their flat sides extended vertically so that the bars will yield in a horizontal direction, but remain relatively non-yieldable in a vertical direction.

As a practical method of construction, two or more lengths of bar stock are used in forming the bumper, the front or impact section A, consisting of two bars 1, 1, clamped together in overlapping relation throughout the central portion thereof, and a single straight bar 2 forming the rear or reinforcing member. While it is obvious that the impact section may be formed of a single bar, the overlapping of two lengths provides a double thickness throughout the length of the bumper intermediate its ends thus affording increased strength.

The bars 1, 1, of the impact section A are treated in the same manner in shaping the ends to obtain the loop form. Each end of the impact member takes the form of U-shaped loops or bends, which are slightly inclined to the rear, by curving the portions of the bars on either side of the bumper extremities. Beyond the U-shaped loops, the ends of the bars 1, 1, extend inwardly and substantially parallel to the forward portion for connection with the adjacent ends of the rear bar 2. This rear bar is somewhat longer than the distance between the frame members 3, 3, of the vehicle, so that the points of connection between the bars are outside of, or beyond the points of support, as indicated by the brackets 4, 4 which are clamped to the rear bar 2 near its ends and are in turn clamped or otherwise secured to the frame members 3, 3.

The connection between the rear end portions of the impact bars 1, 1, and the rear bar 2 are hinge joints 5, 5, formed in any suitable manner such as by the formation of interfitting eyes in the ends of the bars through which a hinge or pivot pin 6 passes.

The effect of the hinged connection between the bars and at the particular points specified, can be more readily appreciated by considering the action of a like structure in the absence of such connections. Bearing in mind that the shock of impact is absorbed by a yielding of the bar at the point of impact, it follows that there is an accompanying distortion throughout the entire impact member. For instance, if a blow is delivered against the right end of the bumper, the tendency is for the impact member to assume the position shown in dotted lines in Figure 1.

It is clear that the maximum bending movement is at the points just beyond the brackets, these points being relatively fixed, and therefore the bars are subject to the greatest strain at these points. Similarly, blows delivered at other points are accompanied by distortions of the bars, all of which include a forward or rearward bending at the points adjacent the bracket. Manifestly, the repeated distortions of the structure are conducive to a weakening at these points, if not to a permanent set or bend, in the event of a severe blow. On the other hand, the presence of the hinged connections 5, 5, permits the bumper to undergo repeated and violent distortion, without materially reducing its resiliency or impairing its capacity for resuming its original form after impact.

I claim as my invention:

1. An automobile bumper comprising an impact member consisting of a resilient bar bent rearwardly and inwardly at its ends to form U-shaped end portions, a rear bar adapted to be secured to the frame of an automobile, and hinges located in said end portions intermediate the points of attachment with said frame and the extremities of the bumper.

2. In an automobile bumper, the combination of an impact member comprising a resilient bar having its ends bent rearwardly and inwardly and a rear bar adapted to be secured to the frame of an automobile and having hinged connection with the ends of said impact member.

3. An automobile bumper comprising an impact bar having its ends bent in U-shape, and terminating rearwardly and inwardly of the ends of the bumper, and a bar having pivotal connection with the ends of said impact bar and adapted to be connected to the frame of an automobile at points intermediate its ends.

4. An automobile bumper comprising an impact member consisting of a resilient bar bent rearwardly and inwardly at its ends to form U-shaped end portions, a bar extending between the ends of said impact member and having pivotal connection therewith and brackets engaging said last mentioned bar adjacent said points of pivoting.

In witness whereof, I hereunto subscribe my name this 2nd day of October, A. D. 1923.

WILLIAM R. McGOWEN.